Figure 1:
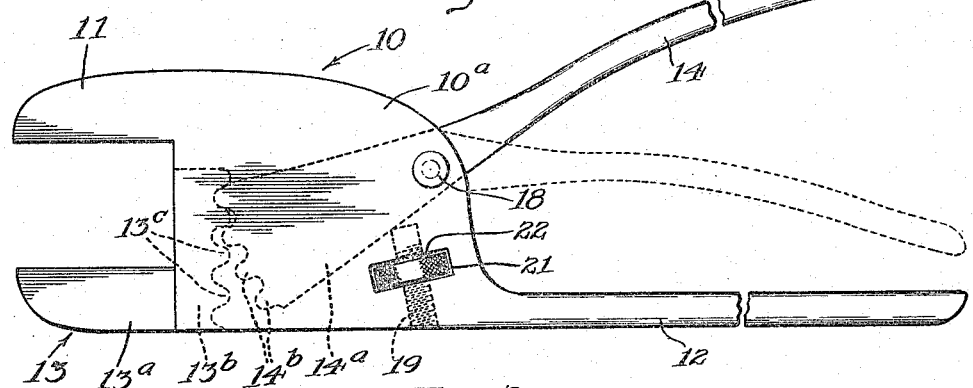
Figure 2:
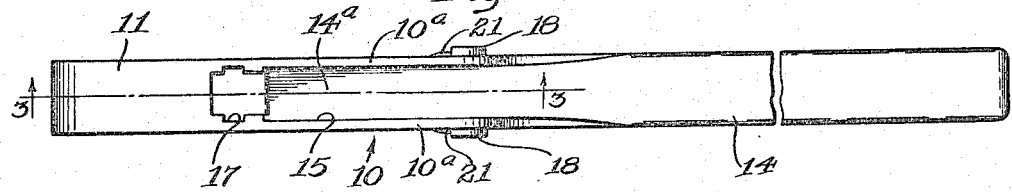
Figure 3:
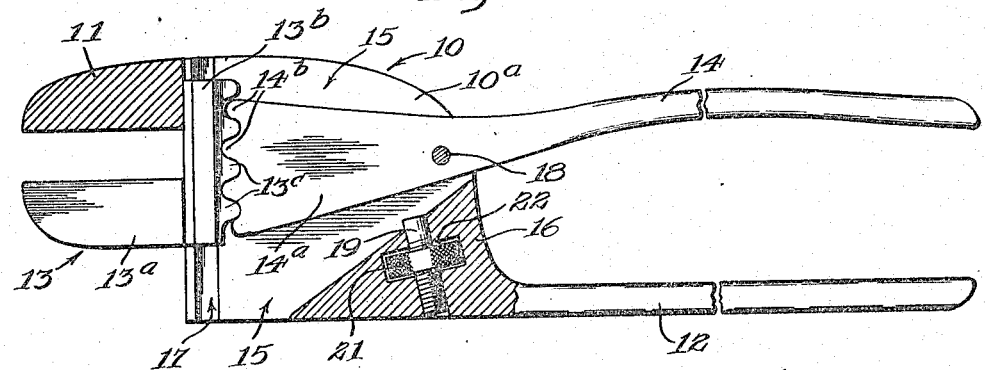

Dec. 2, 1924.

B. L. McNERNEY

WRENCH

Filed Nov. 30, 1923

1,517,304

Inventor
Bernard Lynn McNerney

By Bradbury + Caswell
Attorneys

Patented Dec. 2, 1924.

1,517,304

UNITED STATES PATENT OFFICE.

the other pivoted thereto, a segmental toothed head at the forward end of said pivoted handle, the same moving within the slot in the head-block and meshing with said toothed shank of the movable jaw, an adjustable stop screw, said head-block supplying a mounting for said stop screw, said screw serving as an abutment for the head of the pivoted handle and adapted to variously limit the jaw opening movement of said handle.

In testimony whereof, I have signed my name to this specification.

BERNARD LYNN McNERNEY.